Oct. 31, 1961     A. D. PAULL     3,006,030

MANUFACTURE OF THREADED PLASTIC NIPPLES

Filed March 31, 1955

*INVENTOR.*
AMBROSE D. PAULL.
BY
*Christy, Parmelee & Strickland*
ATTORNEYS.

United States Patent Office 3,006,030
Patented Oct. 31, 1961

3,006,030
MANUFACTURE OF THREADED PLASTIC
NIPPLES
Ambrose D. Paull, Wheeling, W. Va., assignor to Wheeling Stamping Company, Wheeling, W. Va., a corporation of West Virginia
Filed Mar. 31, 1955, Ser. No. 498,139
2 Claims. (Cl. 18—16.5)

This invention relates to the manufacture of externally threaded plastic nipples, and is for a new method and apparatus for making same.

In the manufacture of collapsible tubes, such as those used for dentifrices, it is desirable to have an extruded metal tube with a plastic nipple through which the contents are discharged, and which is externally threaded to receive the tube cap. It is proposed that this nipple have a large base flange, serrated on its periphery, which is set into a cavity or recess in the top or shoulder of a specially formed metal tube with the metal around the recess flanged in over the base flange of the nipple somewhat as shown in Rumball Patent No. 2,122,325, dated June 28, 1938. The serrated flange interlocks with the soft metal of the tube to restrain the nipple against rotation, while the turning of the metal in over the flange of the nipple seals the nipple in the metal. The nipple projects beyond the metal shoulder of the tube, and being externally threaded, receives the tube cap.

While the advantages of such a tube structure have been recognized, the difficulty of making the nipples has posed a problem to the cheap production of such tubes. When the plastic with the serrated flange cures in the mold, the conventional method of unscrewing the threaded article from the mold cannot be used.

A principal object of the present invention is to provide a method of and apparatus for the economical manufacture of nipples of this character or for this purpose.

My invention may be more fully understood by reference to the accompanying drawings, in which.

Figure 1:
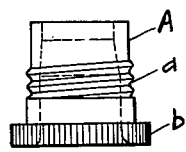
FIG. 1 is a side elevation of the part to be made.

Referring first to FIG. 1, the nipple is designated A and has a neck portion $a$ which is externally threaded, as shown. At the base of the nipple is a flange $b$, the periphery of which is serrated or milled. There is an axial opening through the nipple from end to end.

Figure 2:
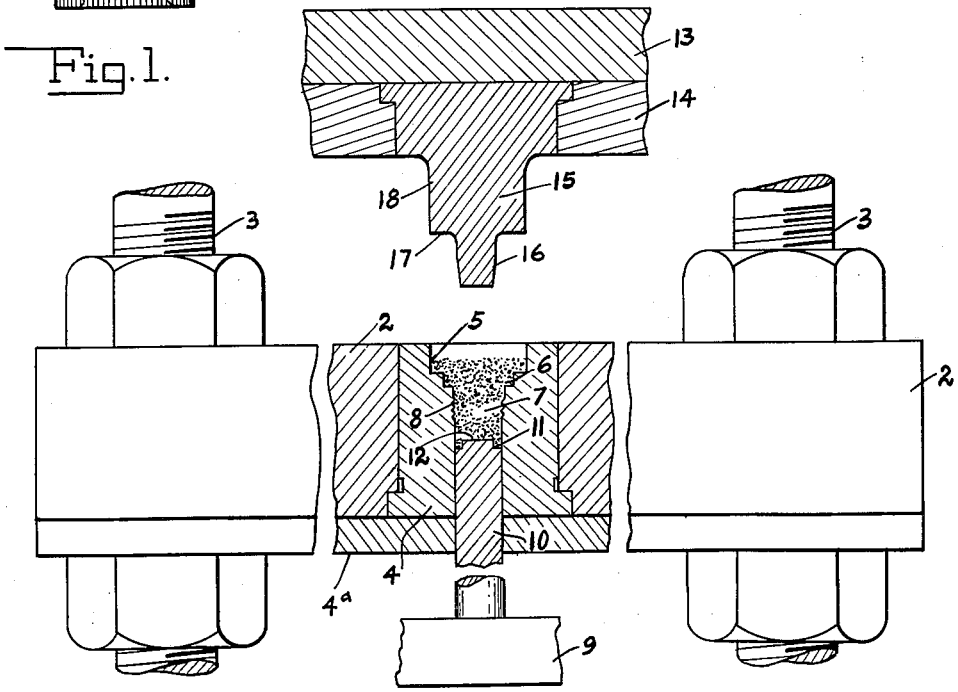
FIG. 2 is a vertical section through a single cavity of the molding apparatus shown in FIG. 1, some associated parts of the press being shown in elevation, the mold being opened and charged with molding compound or powder.

Referring to FIG. 2, there is an intermediate mold plate 2, supported on the upright standards or rods 3 at the sides of the press. This mold plate is provided with a number of similar mold cavities, only one of which is shown, and which is designated 4. Each mold cavity member 4 has an upper chamber 5 of maximum diameter, below which is a shallower recess 6 of smaller diameter. In the periphery of this recess are serrations or teeth, these being the negative counterpart of the serrated edge of the flange of the finished piece. Below the recess 6 the mold cavity member has a bore 7 with threads 8 formed therein. These threads are the negative counterpart of the threads on the nipple. The bore is of uniform diameter, except where the threads increase the diameter to the depth of the thread, and it extends entirely through the member 4. The threads 8 are preferably located in slight spaced relation below the bottom of the recess 6. There is a back-up plate 4a against the bottom of plate 2.

Below the mold plate 2 there is a bottom platen 9 that is movable vertically relative to plate 2. It carries a number of plunger molds 10 centered in the bores 7 of the cavity members 4, only one of such plunger pins or mold elements 10 being shown. The relation of the bottom platen 9 to the plate 2 is such that during operation the pins 10 are not withdrawn from the bottom of the bores 7, being always guided therein. Each pin 10 has a shoulder 11 at its top, with a projection 12 of smaller diameter extending upwardly therefrom to a level just below the level of the threads 8 of the cavity.

The press has an upper platen 13 above the intermediate plate 2 which moves vertically relatively to the plate 2. It carries a mold plate 14 in which are a series of positive mold elements designed to enter the cavity molds from the top, only one such positive mold or "force" being shown, and being designated generally as 15. It has a lower terminal projection 16 of less diameter than the bore 7, slightly tapered at its end, the terminal diameter being equal to the diameter of the projection 12 on the pin 10. Said terminal projection has a length slightly less than the length of the finished molded nipple A. Above the projection 15, the force has a shoulder 17 and a guide part 18 of greater diameter than portion 16, part 18 being designed for a close working fit in the upper recess 5 of the cavity die.

Figure 3:
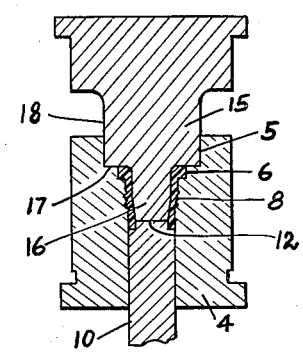
FIG. 3 is a view similar to FIG. 2, but showing only the mold element of the apparatus in closed position.

In operation, a molding compound, such as a resinous molding powder, is charged into the mold cavity as indicated by the stippling in FIG. 2. At this time the pin 10 may be at just the right elevation below the top of the intermediate mold plate 6 to coincide with the length of the finished piece, or, as shown, it may be slightly below this level so as to move up slightly during the pressing operation and compact the molding material by pressure from the bottom as well as the top. After the mold cavity is charged, the press is operated to bring the force down into the mold cavity, and if necessary to slightly raise the pin 10. At the end of the pressing stroke the bottom surface of the force pin contacts (except for possible intervening flash) the top of the pin 10, the parts then being in the position shown in FIG. 3, with the abutting faces of the two projections 16 and 12 being then below the exterior threads formed on the molded piece.

Figure 4:
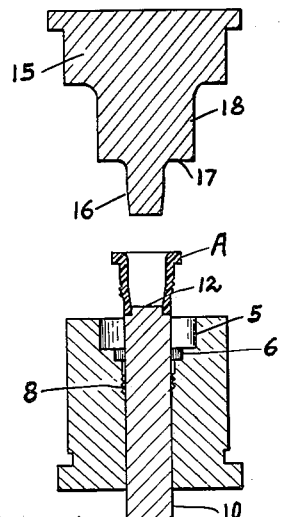
FIG. 4 is a view similar to FIG. 3 showing the finished part at the end of the step of ejecting the finished nipple from the mold.

When the plastic has cured, the upper platen is raised, withdrawing the force from the cavity, and then relative motion is effected between the mold plate 2 and the pin 10 to effect relative movement of the pin 10 upwardly in the mold cavity. This presses the formed piece out of the mold, the piece being lifted above the plate 2 to the level shown in FIG. 4, so that the finished piece is supported above the cavity on the end of the pin 10. A comb, not shown, may subsequently remove the finished piece.

It will be seen that while the cured plastic is in threaded engagement with the threads 8 in the bore 7, and the diameter of the bore is less than the full diameter of the threaded part of the nipple, the finished piece is nevertheless forced up out of the cavity. While it is known in plastic molding to "jump" the threads on the interior of hollow molded objects, such as a bottle cap, after the mold has been opened and the outside of the cap is no longer surrounded by the cavity mold, allowing a momentary expansion of the cap as the threads are jumped, it was not heretofore believed to be practical to jump the threads on the outside of a molded piece and force the threads through an opening of smaller diameter than the finished piece, as the threads would be expected to shear completely off. Instead of the plastic being put in tension, as with the usual method of jumping internal threads, it is here put under great compression. Successful stripping of a thermosetting plastic under these conditions is unexpected and contrary to general experience. It will be noted that at the time the piece is stripped from the mold and the threads are jumped, the projection 16 is entirely clear of the interior of the molded piece, and the projection 12 does not extend up into the part of the nipple about which the threads are formed.

As above indicated, I have specifically illustrated a single mold cavity, but as is usual in this art, many mold parts are provided in a single mold plate, so that a number of pieces are made with each cycle of the press, and my invention comprehends such multiple molds. Also, while I have specifically shown and described the formation of a plastic nipple for use on metal collapsible tubes, the invention is applicable to the forming of various pieces where the same problems are encountered.

I claim:

1. The method of molding an externally-threaded tubular plastic nipple having a peripherally-serrated flange at one end and which restrains the finished piece from rotation in the mold in which it is formed and which is required for the subsequent use of the piece, the threads being formed on the tubular body intermediate the length thereof between the flange and the other end of the body, said method comprising introducing a mass of plastic molding compound into a fixed cavity member, the cavity of which is shaped to the contour of the exterior shape of the finished piece and which has an enlarged plastic receiving and upper positive-mold guiding portion in its upper end, said fixed cavity member also having a flange-forming recess below said enlarged portion, the peripheral walls of which are serrated, the cavity also having a tube-forming extension of lesser diameter extending downward from the flange-forming recess, the said tube-forming extension having internal threads intermediate the top and bottom ends thereof for forming threads on the finished piece, molding the plastic compound in said cavity between two axially-opposed mold elements each of which has a central projection extending toward the other and an annular shoulder at the base of the projection forming end-closures for the cavity during molding, said molding being effected by relative axial movement of the positive mold elements in the cavity until the confronting ends of said projections abut at the lower extremity of the threaded area of the cavity, withdrawing the upper positive mold element from the molded plastic while the piece is retained entirely within the cavity and thereafter moving the lower positive mold element upwardly and forcing the molded piece out of the cavity by longitudinal pressure with the molded threads on the molded piece being jumped past the threads in the cavity, and with the threaded external areas of the piece being above the said projection on the lower positive mold member.

2. Apparatus for molding an externally-threaded tubular plastic nipple, the nipple having an edge-knurled flange at one end, a passage of decreasing diameter therethrough with the larger diameter at the flanged end and with external threads on the nipple intermediate the flange and the other end of the nipple and spaced from said other end, the nipple thus having an unthreaded extension between the threads and said other end, said apparatus comprising a fixed cavity member the cavity of which is shaped to the exterior shape of the finished piece and which has an enlarged plastic-receiving force-guiding portion in its upper end, a flange-forming recess below said enlarged portion the peripheral walls of which are serrated and a tube-forming projection of lesser diameter projecting downwardly from the flange-forming recess, the said tube-forming projection having internal threads intermediate the top and bottom ends thereof, a pin having a sliding fit in the lower end of the tube-forming section of said cavity, said pin having a central projection with an annular shoulder at its base, the pin being of a length to extend into the finished piece in the mold a distance not exceeding the length of the unthreaded end portion of the molded nipple, a force positioned above the cavity in axial alignment with said pin, said force having a central projection of upwardly-increasing diameter, a shoulder at the base of said projection of a diameter to have a working fit in the flange-forming recess of the cavity, the force having an enlarged portion above said last-named portion having a sliding fit in the top of the force-guiding recess in the cavity member, the length of the projection on the force corresponding to the length of the opening through the finished piece from the outer end face of the flange to the beginning of said unthreaded other end of the finished piece, said force being movable from a position where the projection thereon contacts the projection on the said pin to a position where it is entirely clear of the cavity, the said pin being slidable in the cavity member from a lower level where it is positioned during molding to a position above the top of the cavity member.

References Cited in the file of this patent
UNITED STATES PATENTS

| | | |
|---|---|---|
| Re. 19,000 | Scribner | Nov. 14, 1933 |
| 1,679,408 | Davis et al. | Aug. 7, 1928 |
| 2,130,254 | Visman | Sept. 13, 1938 |
| 2,408,629 | Green | Oct. 1, 1946 |
| 2,447,434 | Schwarzkopf | Aug. 17, 1948 |